Nov. 9, 1965  H. M. NANCE  3,217,204
AUTOMATIC SPACING CONTROL SYSTEM
Filed May 10, 1963
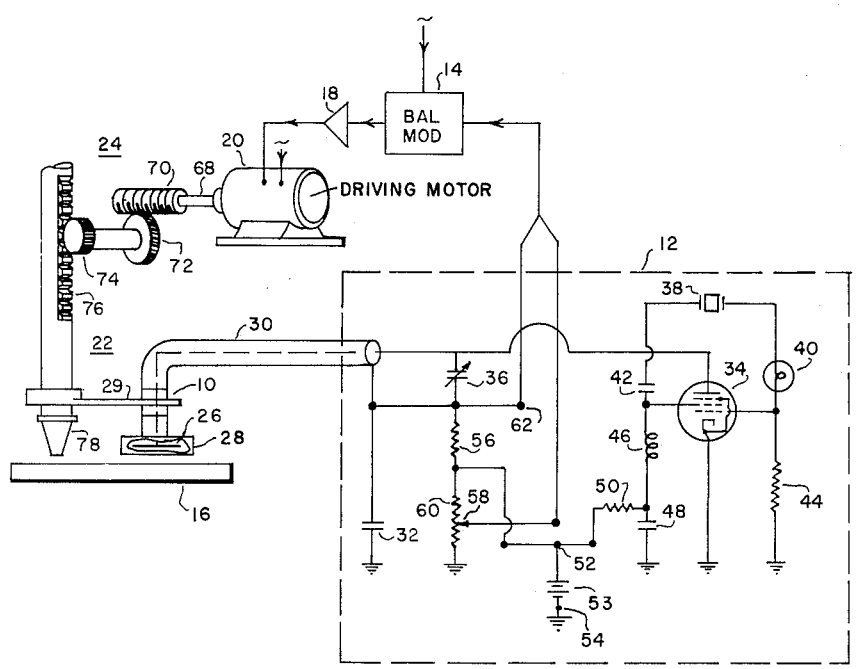
HERSCHEL M. NANCE,
*INVENTOR.*
BY
*ATTORNEYS*

3,217,204
AUTOMATIC SPACING CONTROL SYSTEM
Herschel M. Nance, Wellington, Ala.
Filed May 10, 1963, Ser. No. 279,647
7 Claims. (Cl. 314—71)
(Granted under Title 35, U.S. Code (1952), sec. 266)

The invention described herein may be manufactured and used by or for the Government of the United States of America for governmental purposes without the payment of any royalties thereon or therefor.

This invention relates to automatic spacing or proximity devices and control systems and particularly to such devices and systems which automatically maintain spacing between a movable member and a fixed member.

There are many applications where there exists the requirement that a precise distance be maintained between two relatively movable bodies and there are environmental factors which tend, unavoidably, to vary this distance. Such is the case in many welding operations wherein a substantial problem exists in maintaining a predetermined distance between a welding torch and a workpiece. Due perhaps to the severe electrical disturbances which this type operation presents, known types of proximity detection and spacing control systems have fallen short of providing the degree of accuracy and reliability often required.

It is, accordingly, an object of this invention to provide an improved spacing control system which is both stable and accurate despite severe environmental conditions and, in addition, features a marked reduction in component requirements from those of known previous systems intended for the same purpose.

In accordance with this invention the spacing or proximity which is to be maintained is sensed by reactance probe body (preferably a flat coil) lying substantially in a plane parallel and proximate to another and relatively movable body with respect to which spacing is to be maintained. This reactance is then electrically connected to a stabilized oscillatory circuit wherein the intensity of a current varies as a function of the proximity being sensed. This oscillator circuit includes balancing circuitry to provide a zero electrical output when the probe is set at the desired proximity but provides a finite electrical output when the spacing is in error. This electrical output is of a sense indicating the direction of error and of a magnitude indicating the existence or degree of error. This output is then applied through appropriate circuitry to a reversible motor which serves to move one of the relatively movable bodies in a direction to eliminate the error in spacing, at which point the error output of the oscillator becomes zero and the motor will thus stop at the correct spacing.

Further objects, features, and advantages of this invention will become more apparent from the following description when considered together with the accompanying drawing in which a schematic illustration of the novel automatic spacing control system is shown.

Referring now to the drawing, the system shown therein consists basically of these elements: conductive sensing probe 10; oscillator 12, which is responsive to probe 10; balanced modulator 14, which is fed a variable D.C. voltage level, the magnitude of this level being indicative of the spacing between probe 10 and paramagnetic (in sense) metallic workpiece or body 16; amplifier 18 which receives a carrier wave from modulator 14, this wave being amplitude modulated by the variable D.C. voltage level applied to the input of the balanced modulator 14; reversible motor 20 which is driven by the output of amplifier 18; and welding torch assembly 22 which supports probe 10 and is driven through a gear assembly 24 by motor 20.

Probe 10 consists of a relatively flat coil or inductance 26 enclosed in housing 28 and is adapted to be cooled, as by a conventionally constructed water jacket, through means not shown. In applications where not only spacing control is involved, but seam tracking, housing 28 is of a size to include, in addition, seam tracking coils, such as disclosed in my co-pending application, Ser. No. 221,944, of Sept. 5, 1962, now Patent No. 3,156,856, for a "Seam Tracker." Coil 26 which, for example, consists of 20 turns of #30 wire lying substantially in a plane, is positioned parallel to the surface of workpiece 16 by virtue of enclosure 28 being supported by mounting support 29 on torch assembly 22.

Coil 26 is electrically coupled to oscillator 12 through co-axial cable 30, the outer conductor of co-axial cable 30 being connected through capacitor 32 to ground and the inner conductor of cable 30 being connected to the anode or output electrode of pentode vacuum tube 34. Capacitor 36, which is adjustable, is electrically connected across coil 26 to form a resonant circuit which is tunable in the region of the frequency of oscillation of oscillator 12. This frequency which, for example, is three megacycles, is determined by frequency control crystal 38 connected between the control grid and screen grid of amplifier tube 34 through current limiting resistance 40 (e.g. small pilot lamp) and capacitor 42. The control grid circuit is then completed by resistor 44 connected between the control grid and the ground. The radio frequency load circuit of the screen grid is completed by the inductor 46 connected between the screen grid and ground through radio frequency by-pass capacitor 48. By this oscillator configuration, oscillations are sustained by virtue of the feedback path between control grid and screen grid and thus the stability of operation is not substantially affected by the sensing circuitry in the anode circuit which is electron coupled thereto, this sensing circuitry comprising inductance 26 and variable capacitor 36.

Screen grid current to tube 34 is supplied through resistor 50 from B+ terminal 52 of a direct current source 53. The direct current return or minus terminal 54 of source 53, is connected to ground. Anode current to oscillator tube 34 is supplied through resistor 56 from source 53. The D.C. current drawn through resistor 56 and thus the voltage drop across resistor 56 is a function of the tuning of the resonant circuit made up of coil 26 and capacitor 36 as influenced by the proximity of coil 26 to metallic workpiece 16, the current drawn by resistor 56 and also the impedance of the resonant circuit changing as coil 26 is brought closer to workpiece 16. In order to obtain a D.C. output voltage which is of zero magnitude at the junction of terminals 58 and 62, a balancing voltage is obtained at movable terminal 58 of potentiometer 60 connected across power supply 53, thus at a selected spacing between the inductance 26 and the metallic body 16, the composite D.C. voltage level at the junction of terminals 58 and 62 can be made to approximate zero magnitude by adjustment of terminal 58 along potentiometer 60.

The useful output of oscillator 12 is then the resultant of the voltages appearing across resistor 56 and the upper portion of potentiometer or variable resistance 60, the two voltages thus developed being subtracted. Movable arm 58 may thus be adjusted to provide a voltage which cancels the voltage across resistor 56 for any given position, or spacing, of coil 26 from workpiece 16. This output, which is a D.C. voltage and appears between terminal or sensing means 62 and terminal 58, is applied in an appropriate sense to an input of balanced modulator 14 to achieve corrective servo action (the correct sense dependent upon whether workpiece 16 is paramagnetic or diamagnetic as to direction of magnetism).

Balanced modulator 14 is conventional and receives in addition to the D.C. voltage from oscillator 12 a carrier frequency input such as 60 cycles. Balanced modulator 14 then provides an electrical input to amplifier 18 which is of an amplitude proportional to the magnitude of the variable D.C. level at the junction of terminals 58 and 62 and of a phase with respect to the carrier input of balanced modulator 14 which is in phase or 180° out of phase, depending upon the polarity of the D.C. voltage input received from oscillator circuit 12. The output of amplifier 18, an amplified replica of the input, is fed to two-phased A.C. motor 20 together with a second A.C. input which is in phase with the reference carrier voltage applied to balanced modulator 14. Output shaft 68 of motor 20 turns worm gear 70 to drive, through gears 72 and 74, rack 76 to raise or lower torch assembly 22 and thus maintain torch head 78 at a desired spacing determined by the present position of movable arm 58 of potentiometer 60.

In operation, with potentiometer arm 58 set for a predetermined position of coil 26, and then, due to some unevenness or other disturbance of workpiece 16, the spacing changes, there will result a change in current through resistor 56 which will unbalance the outputs across resistor 56 and potentiometer 60 and supply a signal voltage to balanced modulator 14. This voltage is applied in a sense to cause motor 20 to be fed an error voltage of the correct phase to drive worm gear 70 in a direction to produce a vertical movement of rack 76 which eliminates the error in spacing, at which point the unbalance between the voltages across resistor 56 and potentiometer 60 will disappear and motor 20 will stop.

From the foregoing it will be readily appreciated that a system has been provided which performs a complex task of automatic spacing by a new and simple arrangement of circuitry. Component requirements are few and yet there are no critical components. Extensive operations in controlling electrical arc torch spacing have demonstrated an extreme accuracy and adaptability of the invention.

Obviously many modifications and variations of circuitry and individual components are possible within the above teaching. It is, therefore, to be understood that within the scope of the appended claims the invention may be practiced other than as specifically described.

What is claimed is:

1. An automatic spacing control system for maintaining a probe at a predetermined distance from a metallic body comprising: an inductance, forming a part of said probe, said inductance being positioned in proximity to said metallic body and being movable with respect thereto; an oscillator having an output electrode; a resonant circuit including a capacitor and said inductance interconnected to the output electrode of said oscillator, the impedance of said resonant circuit varying as a function of the spacing between said metallic body and said inductance; a resistor connected in series between said resonant circuit and a D.C. voltage source, the voltage across said resistor varying as a function of the impedance of said resonont circuit; sensing means for determining the voltage across said resistor; and adjustable D.C. voltage source interconnected with said sensing means for providing a composite output voltage proportional to the difference between the voltage across said resistor and the voltage output of said adjustable D.C. voltage source; and electro-mechanical means responsive to said composite output voltage for positioning said probe with respect to said metallic body thereby to maintain a predetermined spacing therebetween established by the adjustment of said adjustable D.C. voltage source.

2. The automatic spacing control system as defined in claim 1 wherein said oscillator includes a vacuum tube having a screen grid and a control grid, and a frequency control crystal, said crystal being interconnected between said control grid and said screen grid for providing fixed frequency of oscillation; and wherein said resonant circuit is tunable within the frequency range of said oscillator.

3. The automatic spacing control system as defined in claim 1 wherein said adjustable D.C. voltage source includes a variable resistance, the setting of which establishes the spacing between said inductance and said metallic body.

4. The automatic spacing control system as defined in claim 1 wherein said electromechanical means includes a reversible motor for moving said inductance toward or away from said metallic body depending upon the polarity of said composite output voltage.

5. The automatic spacing control system as defined in claim 4 wherein said electromechanical means further includes a balanced modulator having an input responsive to said composite output voltage, and an output connected to said reversible motor.

6. An automatic spacing control system for maintaining a torch head a predetermined distance from a metallic workpiece comprising: a coil mechanically connected to said torch head, said coil being positioned in proximity to said metallic workpiece and being movable with respect thereto; an electron tube oscillator having an output electrode, a screen grid, a control grid and a frequency control crystal, said crystal being interconnected between said control grid and said screen grid for providing fixed frequency of oscillation; a resonant circuit including a capacitor and said coil connected in parallel relationship, said resonant circuit interconnected to the output electrode of said oscillator and being tunable within the frequency range of said oscillator, the impedance of said resonant circuit varying as a function of the spacing between said coil and said metallic workpiece; a resistor connected in series between said resonant circuit and a D.C. voltage source, the voltage across said resistor varying as a function of the impedance of said resonant circuit; sensing means for determining the voltage across said resistor; an adjustable D.C. voltage source interconnected with said sensing means for providing a composite output voltage proportional to the difference between the voltage across said resistor and the voltage output of said adjustable D.C. voltage source; and electromechanical means responsive to said composite output voltage for positioning said torch head with respect to said metallic workpiece thereby to maintain a predetermined spacing therebetween established by the adjustment of said adjustable D.C. voltage source.

7. The automatic spacing control system as defined in claim 6 wherein said electromechanical means includes a balanced modulator and a reversible motor, said balanced modulator responsive to said composite output voltage for providing an input signal to said reversible motor, said reversible motor being responsive to said signal from said balanced modulator for moving said torch head toward or away from said metallic workpiece depending upon the polarity of said composite output voltage.

References Cited by the Examiner

UNITED STATES PATENTS

| 2,410,389 | 10/46 | Norrman | 331—73 X |
|---|---|---|---|
| 2,747,152 | 5/56 | Greene | 318—286 |
| 2,971,079 | 2/61 | Sommeria | 219—125 |
| 3,024,354 | 3/62 | Mierendorf et al. | 219—131 |

FOREIGN PATENTS

| 1,079,059 | 5/54 | France. |
|---|---|---|

RICHARD M. WOOD, *Primary Examiner.*

JOSEPH V. TRUHE, *Examiner.*